April 17, 1962 — J. W. H. JUSTICE — 3,030,439
COLOR INDEX TUBE WITH BEAM WOBBLE
Filed July 11, 1958 — 5 Sheets-Sheet 1

INVENTOR

BY

ATTORNEY

April 17, 1962  J. W. H. JUSTICE  3,030,439
COLOR INDEX TUBE WITH BEAM WOBBLE
Filed July 11, 1958  5 Sheets-Sheet 2

INVENTOR

BY
*Theodore Jayk*
ATTORNEY

April 17, 1962   J. W. H. JUSTICE   3,030,439
COLOR INDEX TUBE WITH BEAM WOBBLE
Filed July 11, 1958   5 Sheets-Sheet 3
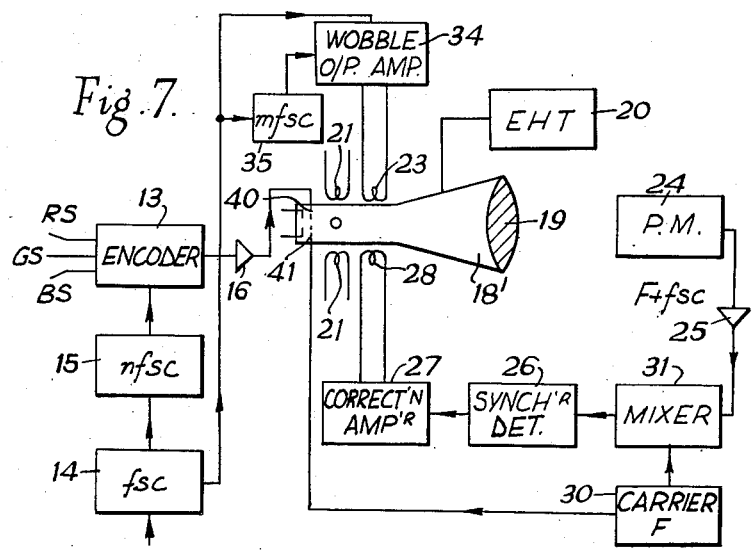
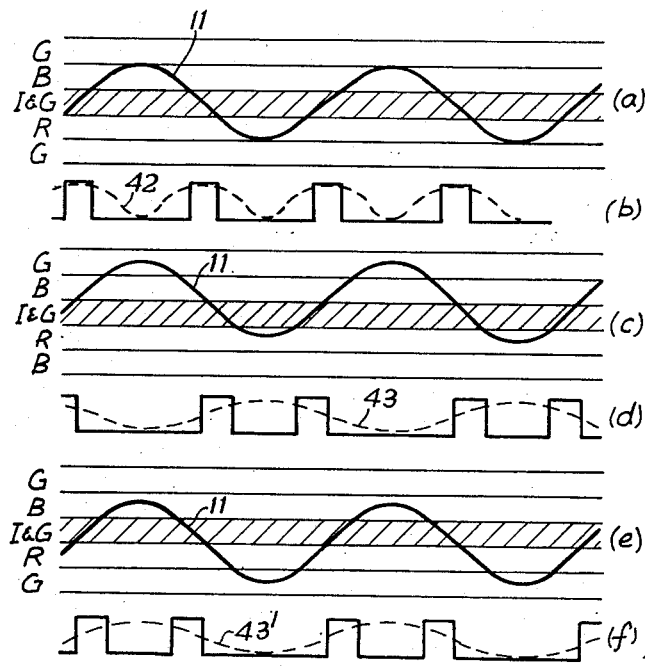
INVENTOR
BY
*Theodore Joyk*
ATTORNEY

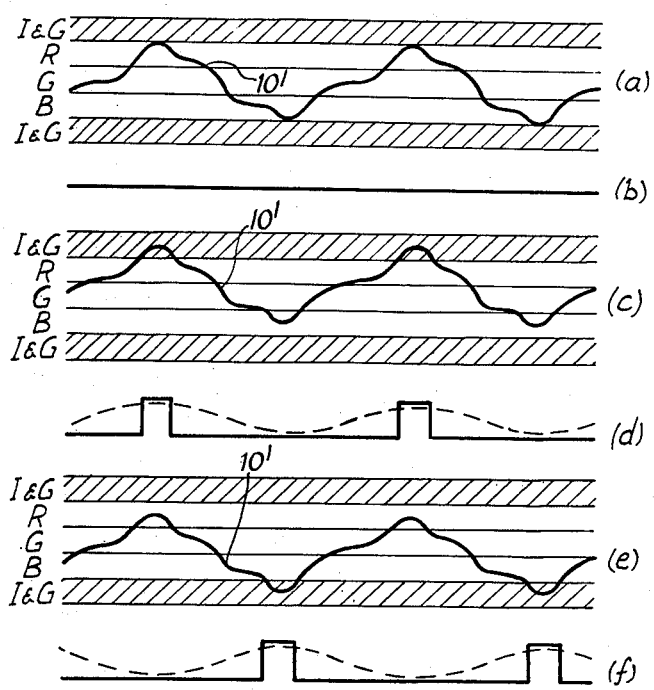
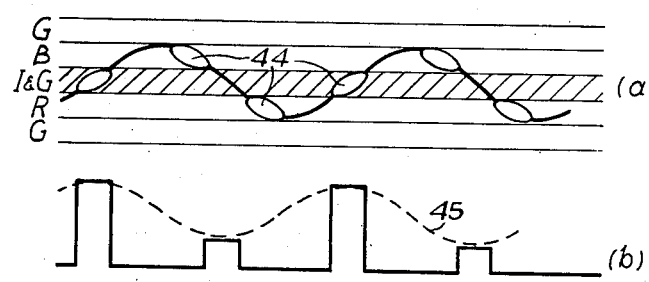
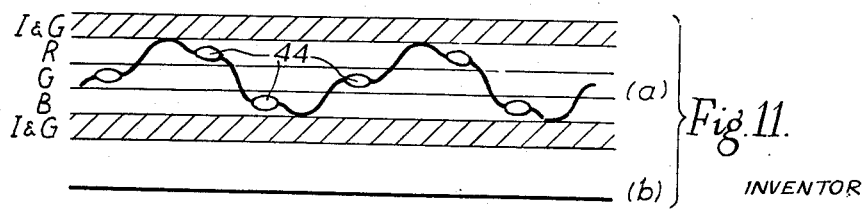
Fig. 9.
Fig. 10.
Fig. 11.

April 17, 1962 J. W. H. JUSTICE 3,030,439
COLOR INDEX TUBE WITH BEAM WOBBLE
Filed July 11, 1958 5 Sheets-Sheet 5
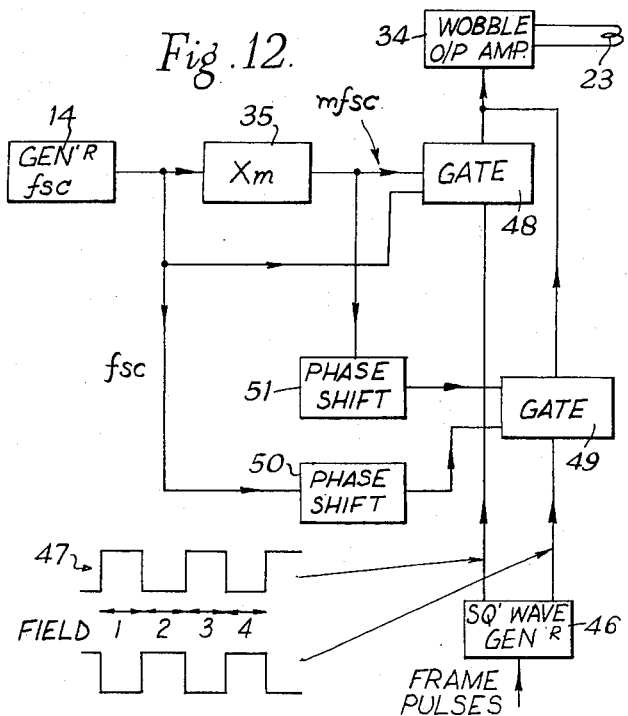
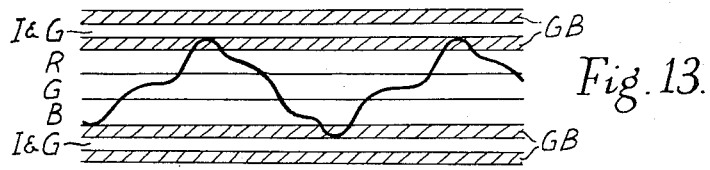
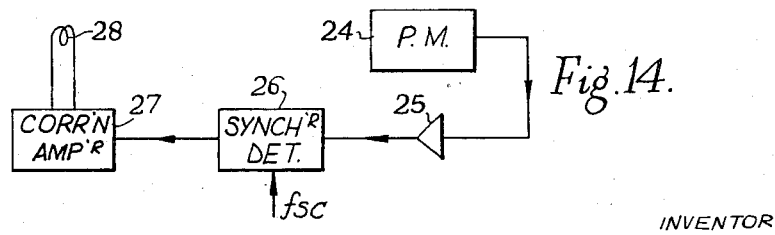
INVENTOR
BY
*Theodor ...*
ATTORNEY

3,030,439
COLOR INDEX TUBE WITH BEAM WOBBLE
James William Henry Justice, London, England, assignor to Sylvania-Thorn Colour Television Laboratories Limited, London, England
Filed July 11, 1958, Ser. No. 747,952
Claims priority, application Great Britain Aug. 15, 1957
5 Claims. (Cl. 178—5.4)

The present invention relates to color television receivers of the type comprising a picture-reproducing screen provided with groups of stripes, each group comprising stripes adapted to produce or transmit, when impinged upon by a beam of radiant energy, light of different colors, means for scanning the beam along the groups in succession, the scanning of each group being in the general direction of the lengths of the stripes and at the same time transversely to this direction, whereby the beam follows a sinuous path which extends in the said general direction and traverses the stripes in each group, and means for applying television signals to control the intensity of the beam in suitable relation to the scanning of the stripes.

The beam may be a light beam or a cathode ray beam and the stripes, hereinafter for convenience referred to as color stripes, may be of different color-transmitting characteristics, but preferably the stripes are adapted to fluoresce in appropriate different colors under bombardment by the beam. Scanning in the general direction along the stripes will be referred to as line scanning.

It is necessary to derive from the scanning an indexing signal which can be applied to maintain the scanning beam properly centred relatively to each group of stripes. For instance there may be provided a photo-multiplier responsive to light of a selected color (say blue) from the screen and the beam is operated with a small standing current at zero video signal amplitude. Assuming that the centre phosphor is blue and that the photo-multiplier only responds to this color there can be generated pulses at twice the group recurrence frequency. When the beam is properly centred these pulses will not contain any component at the group recurrence frequency but when the beam is off centre there will be a component at the group recurrence frequency whose phase is representative of the direction in which the beam is off centre.

The use of this group recurrence frequency component for indexing is, however, rendered difficult by the modulation of the beam, and it is one of the objects of the present invention to provide an improved color television receiver in which this difficulty is avoided.

According to the present invention there is provided a color television receiver of the type set forth wherein there is provided between each two adjacent groups of color stripes an index stripe adapted when impinged upon by the beam of radiant energy, or by another beam of radiant energy, to generate an electrical indexing signal different from the signal generated by impingement upon the color stripes, and indexing means responsive to the said indexing signal for maintaining the sinuous scanning path substantially symmetrical with respect to two index stripes on either sides of a group of color stripes. When two beams, namely a writing and an indexing or pilot beam, are used, the two beams are arranged to move close to one another and for simplicity, in preliminary description it will be assumed that a single beam is used.

It may be arranged that when the beam is properly centred, the scanning spot does not impinge upon an index stripe. When the beam is off centre, however, one or other of the two index stripes on either side of a group of color stripes will be engaged and an indexing signal will be generated.

Alternatively, the beam may be allowed to impinge to some extent, upon the index stripes on each side of the group of color stripes, and the signals obtained when the beam impinges on the upper index stripe is subtracted from that obtained from the lower index stripe. In this way, an index signal representative of the static position of the beam relative to the group of index stripes is obtained.

The index stripes may be of any form such that engagement thereof by the beam produces a signal which is distinguishable from any signal generated by the beam engaging the aforesaid color stripes and which can be used to generate an indexing signal. For instance the index stripes may have a much higher secondary electron emission or may emit much more light in the ultra-violet region than the color stripes.

Some difficulties are met with in adapting receivers of the type set forth for interlaced scanning, that is to say scanning in which the groups of stripes scanned during one field scan are different from the groups scanned during the next field scan. It is a further object of the present invention to provide a receiver which is particularly well adapted for this purpose.

According to a subsidiary feature of the present invention, therefore, the indexing means are arranged to control the mean position of the beam in such a manner that in one field scan the beam traverses a path centred upon an index stripe and in the next field scan the beam traverses a path centred between two adjacent index stripes.

According to a further subsidiary feature of the invention means effecting deflection of the beam in a sinuous path transverse with respect to the direction of line scanning are arranged to generate a beam-deflecting oscillation whose phase is reversed in alternate field scans.

In the specification of patent application Ser. No. 748,089 there is described and claimed a color television receiver in which what is known as the "wobble," that is to say the deflection of the beam in a direction transverse with respect to the direction of line scanning, has a waveform comprising a fundamental component and a component of a suitable harmonic of the fundamental, such that the dwell of the scanning spot on the stripes is increased. Such an arrangement is well adapted for use with the present invention.

In the case where each group of stripes consists of three color stripes with one associated index stripe, a suitable harmonic is the seventh. A suitable amplitude for such harmonic is about one sixth of that of the fundamental.

The invention will be described, by way of example, with reference to the accompanying drawings in which:

FIGS. 1 to 4 are much enlarged diagrams showing the paths of a scanning beam in four successive field scans respectively in an interlaced scanning system according to the invention, FIGS. 5 and 6 are block circuit diagrams of receivers according to the invention, FIG. 7 is a block circuit diagram of a modification of FIG. 6 using a double beam cathode ray tube, FIGS. 8 to 11 are waveform diagrams illustrating scanning methods according to the invention, FIG. 12 is a block circuit diagram of a modification of part of FIGS. 6 or 7, FIG. 13 is a diagram illustrating a modified stripe arrangement that may be employed, and FIG. 14 shows a modification of a part of FIG. 6.

Referring first to FIG. 1, there are shown groups each group containing four different stripes, namely index stripes marked "I+G" and groups of color stripes R, G and B, representing the colors red, green, and blue respectively on the screen of a cathode ray tube. The path of the scanning beam during field 1 is represented by the sinusoid 10. In well known manner, the beam is arranged to be maintained at intensities corresponding to those of received red, green and blue signals while upon the red, green and blue stripes R, G and B respectively. The three color spots are distinguished by different cross-hatchings. The stripes R, G and B are arranged to fluoresce in appropriate colors when bombarded by a cathode ray beam. The index stripes I+G are arranged, when bombarded, not only to yield a distinguishable indexing signal but also to fluoresce with green light.

The indexing signal is applied, during field 1, to hold the beam in the path 10 which is centred between two adjacent index stripes. In field 2, shown in FIG. 2, the path 11 of the beam is centred upon an index stripe I+G, the green stripes G not being traversed and green response being provided by the index stripes.

If the phase of the "wobble" oscillation by which the beam is caused to move in a sinuous path were held constant in fields 1 and 2, the beam in field 2 would follow the dotted line path 10. It will be seen that if this were done the color sequence would be incorrect. Thus in field 1 the sequence is RGB and in field 2 it would be IRB (referring to the index stripe here as I) which is equivalent to GRB. It is for this reason that the wobble oscillation determining the path 11 in field 2 is reversed in phase relatively to that in field 1, thus giving the correct sequence RIB, which is equivalent to RGB.

The paths in fields 3 and 4 are shown in FIGS. 3 and 4 respectively.

The arrangement described does not provide interlace of the red and blue but does provide brightness interlace and interlace of the green, thus reducing the line's visibility of the green. The absence of interlace of red and blue is not a serious disadvantage owing to the lower visibility of these colors.

Another advantage of this system is that the number of stripes required on the screen is substantially less than when the groups are scanned in full interlace as in normal systems. This cheapens the manufacture of the tube, not only because of the smaller number of stripes but also because the size of the scanning spot can be greater. Moreover frame time base linearity and raster shape are not as critical as with a completely interlaced system since a given degree of beam displacement gives rise to a smaller color change owing to the coarser stripe structure.

The index stripes may be made of different width from the color stripes if desired. For instance the screen may be provided with stripes of equal width in the color sequence GRGBGR, and an indexing stripe I which may be of different width from the color stripes may be deposited upon the back (that is the side near the beam source) of alternate green stripes.

Referring now to FIG. 5, signals representative of red, green and blue are applied at RS, GS and BS respectively to an encoder 13. A carrier frequency $nf_{sc}$ derived from a generator 14 of frequency $f_{sc}$ and a frequency multiplier 15 are applied to the encoder which, in well-known manner, gates these signals at the frequency $nf_{sc}$, in the required sequence. The generator 14 may be a local oscillator and is preferably held in synchronism in known manner with the color burst signals which form part of the received television signals. The output of the encoder is applied through an amplifier 16 to the control electrode 17 of a cathode ray tube 18 having its screen 19 provided with stripes as described with reference to FIGS. 1 to 4. The beam intensity is thus increased when the beam is directed upon the stripes. A source of EHT is shown at 20. Frame deflection sawtooth oscillations are applied at 21 and line deflection sawtooth oscillations are applied at 22. A wobble waveform is applied to a coil 23 from a wobble output amplifier 34.

Indexing signals derived from scanning of index stripes are generated in a photo-multiplier 24 and applied to an amplifier 25 tuned to the frequency $f_{sc}$ the output of which is coupled to a synchronous detector 26 to which is fed an oscillation of frequency $f_{sc}$ from the generator 14. The output of the synchronous detector 26 is applied through a correction output amplifier 27 to a correction coil 28 which corrects any errors in beam position under control of the indexing signals.

Index amplitude correction will be required when indexing along an index stripe since the indexing output from the photomultiplier 24 will depend upon the picture brightness corresponding to that stripe. For the purpose of this correction, therefore, a suitable proportion of the green picture signal GS is applied at 36 through a gate 37 controlled by frame pulses applied at 38, and through an index amplitude correction circuit 29 to vary the gain of the photo-multiplier 24 in such a manner as to remove the picture modulation on the indexing signal. The gating by frame pulses is effected in order to provide correction only during the field scans which are centred on an index stripe since correction is unnecessary when indexing between index stripes if the size of the scanning spot is sufficiently small.

The circuit of FIG. 6 differs from that of FIG. 5 in the provision of a further carrier generator 30 generating a frequency F which is applied to the control grid 17, in addition to the output of the amplifier 16. This carrier F is also applied to a mixer 31 where it is mixed with the indexing signal from 24, 25 having a frequency $F+f_{sc}$ or $F-f_{sc}$. The effect of this is to reduce the picture modulation of the indexing signal.

The dwell of the paths 10 and 11 in FIGS. 1 to 4 on the color stripes can be substantially increased by adding to the wobble sinusoid a seventh harmonic component of about one sixth the amplitude of the fundamental. As shown in FIGS. 5 and 6 this harmonic may be generated in a frequency multiplier 35 the output of which is combined with that from the wobble generator 34.

FIG. 7 shows a modification of FIG. 6 in which a double-beam cathode ray tube 18' is used. The signals from amplifier 16 are applied to one control grid 40 and carrier oscillations from the oscillator 30 are applied to the other control grid 41.

The pilot beam controlled by the grid 41 scans the screen 19 in synchronism with the writing beam controlled by the grid 40 and is modulated by the carrier oscillations at a frequency F. Indexing signals generated by the pilot beam in the photo-multiplier 24 are fed to the amplifier 25 which is tuned to $F+f_{sc}$ or $F-f_{sc}$. The signal from the amplifier 25 (say of frequency $F+f_{sc}$) is applied to the mixer 31 where it is mixed with the frequency F and a signal of frequency $f_{sc}$ so obtained is synchronously detected at 26 and applied through the amplifier 27 to correction deflecting coils 28. Any error in beam position is thus corrected. The harmonic generated in 35 is in this example, using stripes as hereinafter described with reference to FIGS. 8 to 11, the seventh.

The advantage of the double-beam tube 18' is that even if the tube has a non-linear output current/input voltage characteristic the output of the amplifier 25 is nevertheless independent of the picture signals.

FIG. 8 shows the way in which the indexing means operate, no harmonic of the wobble frequency being shown in these figures.

In FIG. 8(a) there is shown the path 11 followed by a scanning beam during part of one field scan when it is correctly centred on the index stripe I+G. FIG. 8(b) shows in full lines the waveform generated in the photomultiplier 24 under this condition and at 42 is shown in dotted line the fundamental component of the waveform. It will be seen that this component has a frequency twice the wobble frequency $f_{sc}$.

FIG. 8(c) shows the path 11 displaced upwards and it is seen that the waveform then generated as shown in FIG. 8(d) has a fundamental component 43 at the frequency $f_{sc}$. FIG. 8(e) and (f) are corresponding diagrams for the case when the beam is too low and it is seen that the component 43' has the same frequency as the component 43 but is displaced 180° in phase relatively thereto.

FIG. 9 illustrates the path followed during the next field scan when the beam is required to be centred between the index stripe. In FIG. 9 the wobble waveform is shown as including a fourth harmonic component. The diagrams (a) to (f) in FIG. 9 correspond to diagrams (a) to (f) in FIG. 8 respectively and it is seen that when the beam is properly centred there is no output from the photo-multiplier (FIG. 9(b)). When the beam is high or low there is an output at the frequency $f_{sc}$ and the amplitude and phase of this output is dependent upon the extent of the deviation and whether it is in an upward or downward direction.

FIGS. 10 and 11 illustrate the the fact, already referred to, that when indexing along an index stripe modulation of the cathode ray beam has the effect of producing an output in the photo-multiplier 24 at the frequency $f_{sc}$ even when the beam is correctly centred. In FIG. 10(a) the modulation is shown as producing "bright-up" of the beam 44 and at 45 in FIG. 10(b) is shown the component at $f_{sc}$.

When indexing between stripes as shown in FIG. 11(a) the modulation 44 produces no output as indicated in FIG. 11(b). In FIG. 11(a) the path is shown as having a fourth harmonic component.

This effect of modulation can be corrected or avoided as described with reference to FIGS. 5, 6 or 7. Any residual effect such as may be present if the scanning spot is large may be reduced, as shown in FIG. 13, by making the index stripes I+G narrower and by providing a guard band GB of inert material on either side of each index stripe.

FIG. 14 shows a modification of a part of FIG. 6 suitable for use with the form of screen described with reference to FIG. 13.

FIG. 12 shows one form that the circuit 34, 35, 23 of FIGS. 5, 6 or 7 may take when it is required to reverse the phase of the wobble oscillation at the end of each field scan. This avoids the need to change the color sequence produced by the encoder 13.

Figure 1:
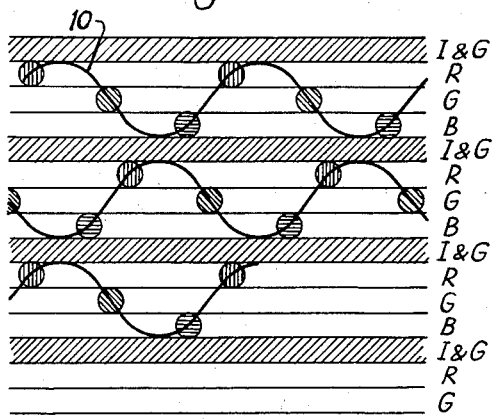
Figure 3:
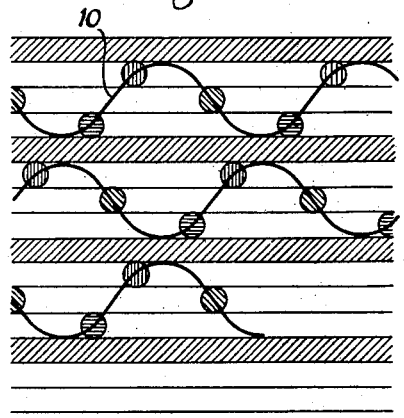
Figure 2:
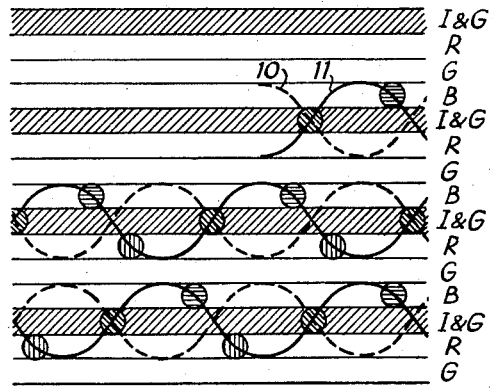
Figure 4:
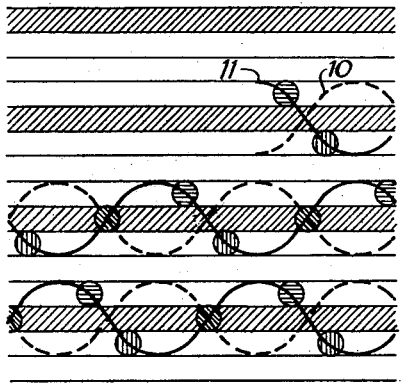
Figure 5:
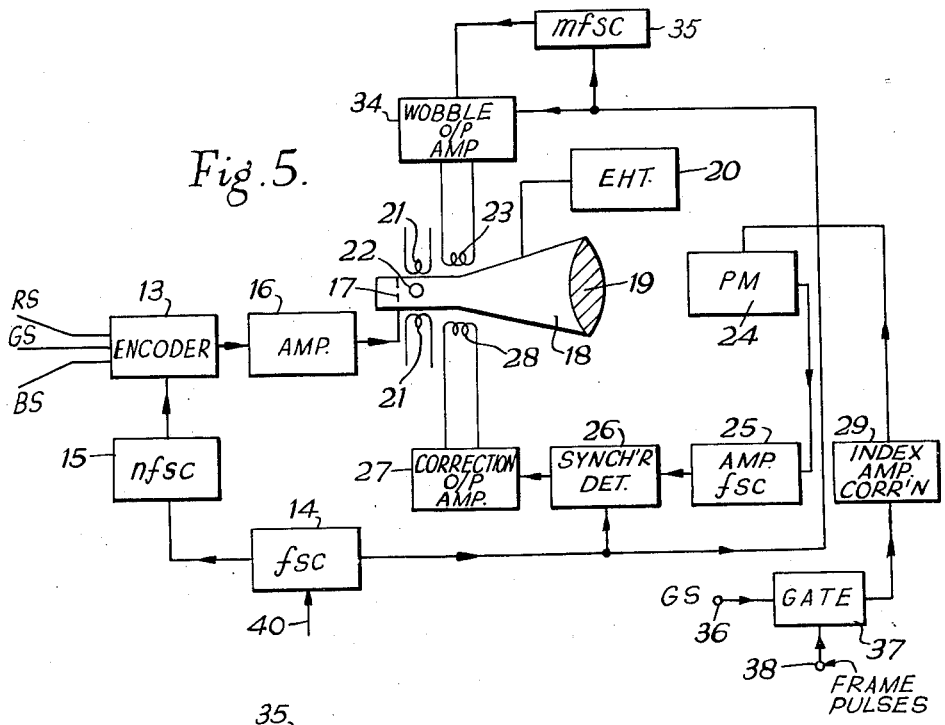
Figure 6:
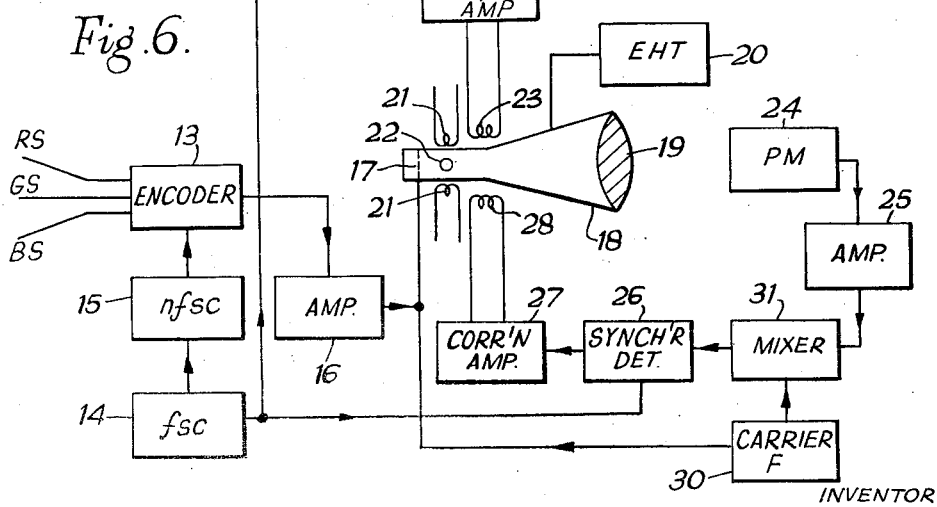

In FIG. 12 there is shown a square wave generator 46 generating two square waves of opposite phase controlled by frame pulses to bear the relations shown at 47 to the field scans. These square waves are applied to gates 48 and 49 to open these gates alternately, one being open when the other is closed. Phase shift networks 50 and 51 serve to invert the phases of the oscillations of frequency $f_{sc}$ and $mf_{sc}$ respectively.

It will be understood that although special reference has been made to indexing by photo-electric means, other means such as those depending upon differences in secondary electron emission may be used.

In order to reduce the effect upon the indexing signal of the size of the scanning spot and the modulation of the beam, each indexing stripe may be arranged between two guard bands. These guard bands may be stripes which are left blank or preferably filled with an inert substance.

I claim:
1. A color television receiver comprising a picture-reproducing screen, beam-producing means generating at least one beam of radiant energy directed upon said screen, groups of parallel color stripes on said screen, each said group comprising a plurality of stripes emitting light of different color when impinged upon by said beam, an index stripe on said screen between each adjacent pair of said groups, means responsive to impingement by said beam on each of said index stripes to generate an indexing signal, first means for deflecting said beam recurrently in a first direction generally parallel to said stripes, second means for deflecting said beam in a second direction transverse with respect to said stripes at a frequency much greater than the recurrence frequency of said deflections in said first direction, whereby said beam follows a sinuous path along a group of stripes, means coupling said responsive means to said second means and applying said indexing signal to maintain said path substantially symmetrical with respect to index stripes on either side of said group of color stripes and third means for deflecting said beam in said second direction at a frequency much less than the recurrence frequency of said deflection in said first direction, whereby said beam traverses a succession of sinuous paths along axes parallel to said stripes, said third means deflecting the axis of said sinuous path by half the distance between adjacent index stripes in each recurrence period corresponding to said recurrence frequency, said indexing signal applied to said second deflecting means maintaining said axis substantially coincident with an index stripe in alternate ones of said recurrence periods.

2. A receiver according to claim 1, wherein said second means comprises means generating an electrical oscillation and means for reversing the phase of said oscillation in alternate ones of said recurrence periods.

3. A receiver according to claim 1, comprising a source of received signals, means for modulating the intensity of said beam in accordance with said received signals, said modulation affecting the amplitude of said indexing signals, means coupling said source to said responsive means and applying to said responsive means a compensating signal substantially cancelling the effect of said modulation on said indexing signal and means rendering said coupling means between said source and said responsive means operative only during alternate ones of said recurrence periods when said axis is substantially coincident with said index stripe.

4. A color television receiver comprising a picture-reproducing screen, beam-producing means generating a pilot beam of radiant energy and a writing beam of radiant energy, means directing said beams to adjacent points on said screen, groops of parallel colour stripes on said screen, each said group comprising a plurality of stripes emitting light of different color when impinged upon by said writing beam, an index stripe on said screen between each adjacent pair of said groups, means responsive to impingement by said pilot beam on each of said index stripes to generate an indexing signal, first means for deflecting said beams recurrently in a first direction generally parallel to said stripes, second means for deflecting said beams in a second direction transverse with respect to said stripes at a frequency much greater than the recurrence frequency of said deflections in said first direction, whereby each of said beams follows a sinuous path along a group of stripes, means coupling said responsive means to said second means and applying said indexing signal to maintain said paths substantially symmetrical with respect to index stripes on either side of said group of colour stripes, and third means for deflecting said beams in said second direction at a frequency much less than the recurrence frequency of said deflection in said first direction, whereby said beams traverse a succession of sinuous paths along axes parallel to said stripes, said third means deflecting the axis of said sinuous paths by half the distance between adjacent index stripes in each recurrence period corresponding to said recurrence frequency, said indexing signal applied to said second deflecting means maintaining said axis substantially coincident with an index stripe in alternate ones of said recurrence periods.

5. A receiver according to claim 4, wherein said second means comprises means generating an electrical oscillation and means for reversing the phase of said oscillation in alternate ones of said recurrence periods.

References Cited in the file of this patent

UNITED STATES PATENTS

| | | |
|---|---|---|
| 2,634,326 | Goodrich | Apr. 7, 1953 |
| 2,677,723 | McCoy et al. | May 4, 1954 |
| 2,725,421 | Valdes | Nov. 29, 1955 |
| 2,773,118 | Moore | Dec. 4, 1956 |
| 2,809,233 | Keizer | Oct. 8, 1957 |
| 2,892,020 | Sziklai | June 23, 1959 |